US 9,473,478 B2

(12) United States Patent
Subramanian et al.

(10) Patent No.: US 9,473,478 B2
(45) Date of Patent: *Oct. 18, 2016

(54) RESIDENTIAL GATEWAY BASED POLICY

(71) Applicant: ALCATEL-LUCENT CANADA, INC., Ottawa (CA)

(72) Inventors: Ramaswamy Subramanian, Ottawa (CA); Tiru K Sheth, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 218 days.

This patent is subject to a terminal disclaimer.

(21) Appl. No.: 14/034,878

(22) Filed: Sep. 24, 2013

(65) Prior Publication Data

US 2015/0089594 A1 Mar. 26, 2015

(51) Int. Cl.
H04L 29/06 (2006.01)

(52) U.S. Cl.
CPC .............. H04L 63/08 (2013.01); H04L 63/20 (2013.01)

(58) Field of Classification Search
CPC . H04L 63/08; H04L 63/201; H04L 63/0281; H04L 63/20; G06F 21/31; G06F 21/6218
See application file for complete search history.

(56) References Cited

U.S. PATENT DOCUMENTS

| 2004/0133631 | A1* | 7/2004 | Hagen ............... G06F 17/30873 709/203 |
| 2007/0097860 | A1* | 5/2007 | Rys ......................... H04L 63/10 370/229 |
| 2008/0056240 | A1* | 3/2008 | Ellis et al. ..................... 370/352 |
| 2008/0310303 | A1* | 12/2008 | Wang et al. ............... 370/230.1 |
| 2009/0285215 | A1* | 11/2009 | Kaippallimalil et al. ..... 370/392 |
| 2010/0228989 | A1* | 9/2010 | Neystadt et al. ............. 713/185 |
| 2011/0119720 | A1* | 5/2011 | Fan et al. ...................... 725/109 |
| 2012/0018506 | A1* | 1/2012 | Hammad et al. ............. 235/375 |
| 2013/0312046 | A1* | 11/2013 | Robertson et al. ............ 725/93 |

\* cited by examiner

Primary Examiner — Ali Abyaneh
Assistant Examiner — Shaqueal Wade
(74) Attorney, Agent, or Firm — Kramer & Amado, P.C.

(57) ABSTRACT

Various exemplary embodiments relate to a method performed by a policy server in a communication network. The method includes receiving an access request message including a residential gateway identifier and a subscriber identifier; evaluating a policy rule based on the residential gateway identifier, the policy rule including a condition referencing the residential gateway identifier; and responding to the access request message based on evaluation of the policy rule and the subscriber identifier. The method may further include: receiving an IP address of the residential gateway; storing the IP address in association with the residential gateway identifier; receiving, from a service portal, a request for identification of a residential gateway associated with an IP address; sending the stored residential gateway identifier to the portal; receiving new subscriber information; and changing the authorization of the residential gateway based on the new subscriber information.

18 Claims, 5 Drawing Sheets

| Name | Condition | Action |
|---|---|---|
| Certified Devices | MAC Addr matches pattern [00:22:68.*, 00:18,3f.*] | Accept, provide service based on subscriber |
| Blocked Devices | Marketing Name = badDevice | Deny |
| Certified Device; Unknown Subscriber | Marketing Name = iPad AND Subscriber = Unknown | Provide Default Services |

FIG. 3

RESIDENTIAL GATEWAY BASED POLICY

CROSS-REFERENCE TO RELATED APPLICATIONS

This application is related to the following co-pending application, which is hereby incorporated by reference for all purposes as if fully set forth herein: application Ser. No. 14/034,924, filed on Sep. 24, 2013, "SERVICE PROVIDER CERTIFIED DEVICE POLICY MANAGEMENT."

TECHNICAL FIELD

Various exemplary embodiments disclosed herein relate generally to communications networks.

BACKGROUND

Communications network operators often provide various service types to a customer. For example, it is common for service providers to offer various combinations of voice, video, and high speed data service.

Service providers may provide customer equipment for accessing the various services. For example, service providers may provide set top boxes and residential gateways. Customers may also connect their own equipment including residential gateways and set top boxes as wells as phones, televisions, and computers to the service provider's network.

The number of possible devices that a customer may connect to a service provider's network raise compatibility issues.

SUMMARY

In view of the foregoing, it would be desirable to allow service providers additional control over their networks. In particular, it would be desirable to allow service providers to make policy decisions based on the type of residential gateway used by a customer. It would also be desirable to allow customers to select appropriate service plans based on their equipment.

In light of the present need for service provider control, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy server in a communication network. The method includes receiving an access request message including an residential gateway identifier and a subscriber identifier; evaluating a policy rule based on the residential gateway identifier, the policy rule including a condition referencing the residential gateway identifier; and responding to the access request message based on evaluation of the policy rule and the subscriber identifier.

In various embodiments, the identifier is a dynamic host configuration protocol (DHCP) option 60 vendor class identifier. The method may further include comparing the vendor class identifier to predefined identifiers and determining a type of the residential gateway.

In various embodiments, the identifier is a (MAC) address. The method may further include comparing the MAC address to an address prefix.

In various embodiments, the step of responding to the access request message based on evaluation of the policy rule and the subscriber identifier includes: determining that the subscriber identifier is not associated with a valid service plan; authorizing a default session allowing the residential gateway to communicate with a service portal; and storing the residential gateway identifier and subscriber identifier in association with the default session.

In various embodiments, the method further includes: receiving an IP address of the residential gateway in an accounting start message; storing the IP address in association with the residential gateway identifier; receiving, from a service portal, a request for identification of a residential gateway associated with an IP address; sending the stored residential gateway identifier to the portal; receiving new subscriber information; and changing the authorization of the residential gateway based on the new subscriber information. The method may further include: determining residential gateway capabilities based on the residential gateway identifier; and sending the residential gateway capabilities to the portal.

In various embodiments, the condition references a plurality of network gateway identifiers.

Various exemplary embodiments relate to a policy server. The policy server includes a network interface configured to receive an access request message initiated by a residential gateway attaching to a network, the access request message including a residential gateway identifier and subscriber identifier; and a rules engine processor configured to evaluate conditions of policy rules and execute actions corresponding to true conditions, at least one policy rule including a condition based on the residential gateway identifier.

In various embodiments, the condition of the at least one rule includes a certified residential gateway identifier and the action of the at least one rule instructs the rules engine to allow a session providing service to the residential gateway. The policy server may further include: a session information storage configured to store information regarding the session including the residential gateway identifier; and an application programming interface configured to provide an external service portal access to the session information and configured to receive subscriber information from the service portal.

In various embodiments, the policy server further includes a device mapper configured to determine residential gateway characteristics based on the residential gateway identifier. The policy server may further include a session information storage configured to store the residential gateway characteristics determined by the device mapper; and an application programming interface configured to provide an external service portal access to the residential gateway characteristics and configured to receive subscriber information from the service portal.

It should be apparent that, in this manner, various exemplary embodiments enable policy decisions based on a residential gateway. In particular, a policy server may allow a network operator to identify a residential gateway used by a subscriber and make policy decisions based on characteristics of the residential gateway.

BRIEF DESCRIPTION OF THE DRAWINGS

In order to better understand various exemplary embodiments, reference is made to the accompanying drawings, wherein:

FIG. 3 illustrates an exemplary rule table;

DETAILED DESCRIPTION

Figure 1:
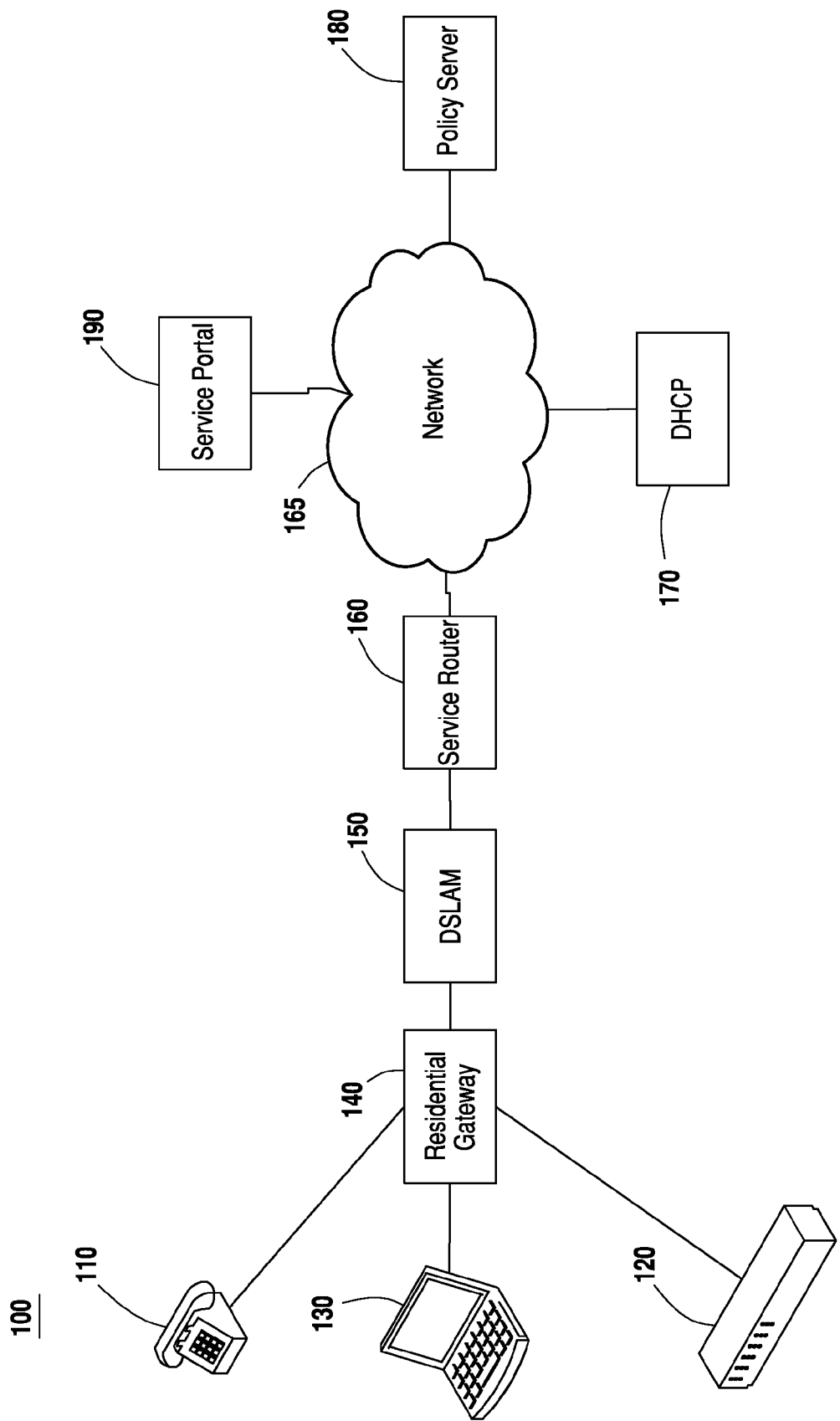
FIG. 1 illustrates an exemplary communications network.

Referring now to the drawings, in which like numerals refer to like components or steps, there are disclosed broad aspects of various exemplary embodiments.

FIG. 1 illustrates an exemplary communications network 100. Communications network 100 may be a communications network for providing service to residential or business subscribers. Accordingly, communications network 100 may be considered a subscriber network. Communications network 100 may include customer equipment such as telephone 110, set top box 120, computer 130, and residential gateway 140. The customer equipment may be associated with a subscriber identifier. The subscriber identifier may be an account name or number that uniquely identifies an individual or group associated with an account of a network operator. Communications network 100 may also include a digital subscriber line access multiplexer (DSLAM) 150, a service router 160, a dynamic host configuration protocol (DHCP) server 170, a policy server 180, and a service portal 190.

Telephone 110 may be any telephone capable of providing digital voice over IP (VoIP) communication. Telephone 110 may be a device supplied by a subscriber. Telephone 110 may be a land-line telephone, meaning the telephone call is carried over a wired network rather than a radio-access network. Telephone 110 may establish a voice session with subscriber network 100. As will be discussed in further detail below, a mobile device such as a smart phone, may establish a data session rather than a voice session.

Set top box 120 may be a device that provides video service to a subscriber's television. Set top box 120 may be provided by a service provider as part of a subscriber's service package. In various embodiments, set top box 120 may also include various devices provided by a subscriber. For example, set top box 120 may be a cable card integrated into a television. As another example, set top box 120 may be a third party set top box purchased by the subscriber.

Computer 130 may be any device that establishes a data session with network 100. Computer 130 may include desktop computers, laptop computers, tablets, smart phones, and any other device that establishes a data session.

Residential gateway 140 may be a device that connects one or more subscriber devices to network 100. In various embodiments, residential gateway 140 may be a wireless router providing a data connection using a wireless protocol such as any of the 802.11 wireless protocols. Residential gateway 140 may also provide for wired Ethernet connections. In various embodiments, residential gateway 140 may include a DSL modem, cable modem, or optical network terminal (ONT). When connected, residential gateway 140 may initiate a network connection using DHCP. An initial DHCP discover request may include a residential gateway identifier. A residential gateway identifier may include any identifier that uniquely identifies the residential gateway or a non-unique identifier that identifies properties of the residential gateway 140. In various embodiments, the residential gateway identifier may be in the form of a MAC address, DHCP option 60 vendor class identifier, or a combination of both.

DSLAM 150 may be a device controlled by a service provider. The DSLAM 150 may include a plurality of ports for connecting to residential gateway 140, subscriber premises equipment, or customer premises equipment (CPE). Accordingly DSLAM 150 may aggregate the connections of a plurality of subscribers. DLAM 150 may send and receive traffic from a backbone connection to service router 160. In various embodiments, DSLAM 150 may be connected to a fiber optic backbone and function as an optical line terminator (OLT). DSLAM 150 may add physical connection information such as a circuit ID to a service request.

Service router 160 may be a router configured to process data traffic for a subscriber. Service router 160 may receive packets and forward them toward their destinations. Service router 160 may also be involved in subscriber access and authentication. Service router 160 may receive an access request or a DHCP discover request originating from any device and generate a RADIUS access request to policy server 180. Service router 160 may also forward the DCHP discover request toward a DHCP server 170. Service router 160 may include any known subscriber and device information in the service request.

Network 165 may be a communications network for transmitting information. In various embodiments, the network 165 may be an internet protocol (IP) core network of a network operator. The network 165 may interconnect various network nodes of the network operator such service router 160, DHCP server 170, policy server 180, and service portal 190. The network 165 may be further connected to other networks, forming part of the Internet. The network 165 may include a plurality of intermediate network nodes such as routers and switches, which are not shown.

DHCP server 170 may be a server configured to implement the dynamic host configuration protocol. DHCP server 170 may be integrated with another network server such as, for example, service router 160 or policy server 180. DHCP server 170 may assign an internet protocol (IP) address to a residential gateway in response to a DCHP request.

Policy server 180 may be a server controlled by a service provider for managing a subscriber network. Policy server 180 may be a RADIUS server communicating with one or more RADIUS clients such as, for example, service router 160. Policy server 180 may be responsible for managing subscriber account information and making policy decisions regarding subscriber sessions. As will be described in further detail below, policy server 180 may be configured to make policy decisions based on a residential gateway identifier. Accordingly, policy server 180 may control which residential gateways are allowed access to the network 100. Policy server 180 may also be responsible for enforcing service level agreements and processing billing information for subscribers. Policy server 180 may further communicate with a service portal 190 to allow a subscriber to access service plan information and change service plans.

Service portal 190 may be a server controlled by a network operator. Service portal 190 may allow subscribers to view subscription and usage information, to change subscriptions, to make payments, to order customer equipment, or perform other tasks related to a subscription. Service portal 190 may be a web server configured to interact with subscribers of the network operator using standard web protocols such as HTTP. Service portal 190 may interact with a policy server 180 using an application programming interface, which will be described in further detail below.

Figure 2:
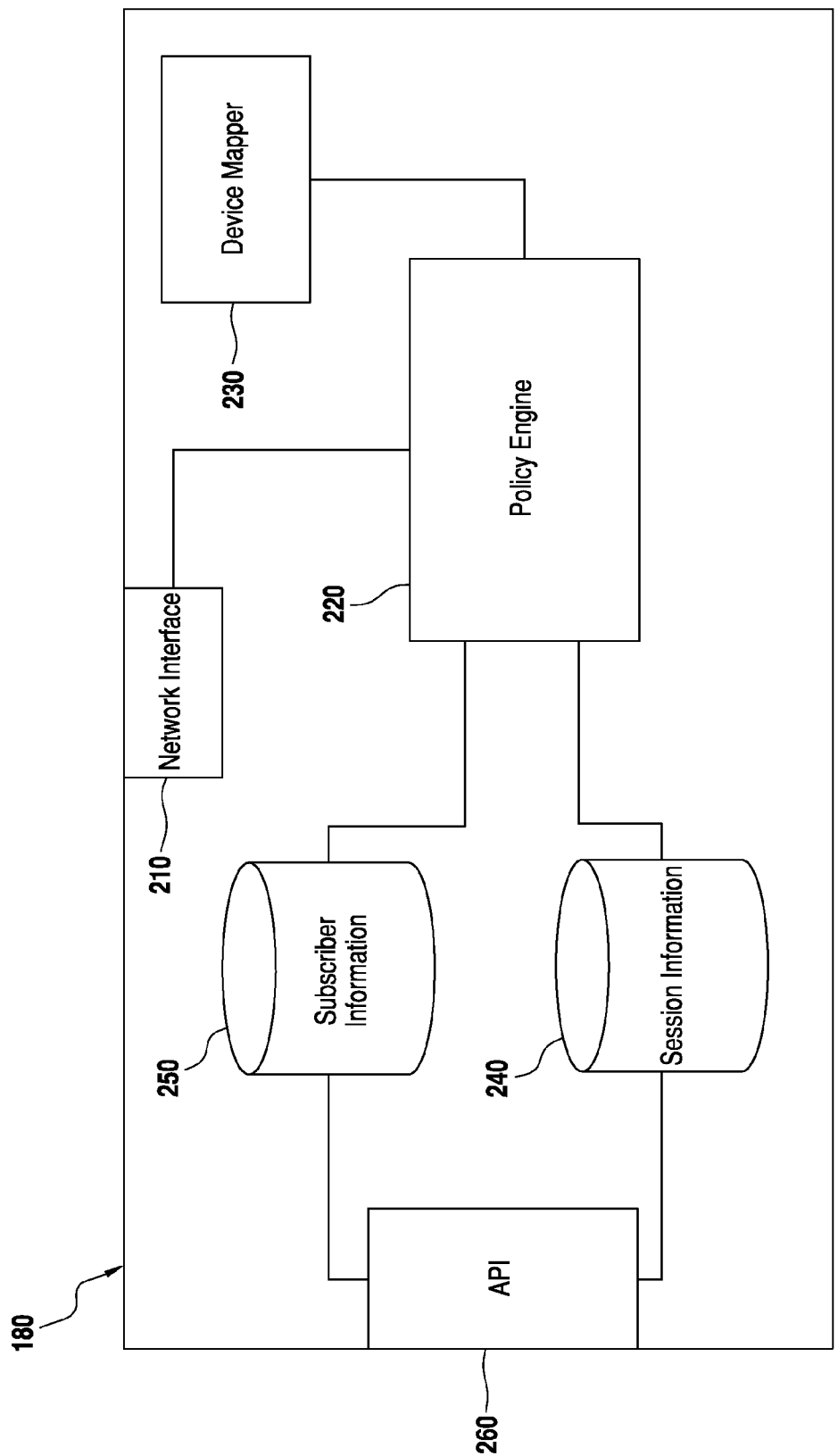
FIG. 2 illustrates an exemplary policy server.

FIG. 2 schematically illustrates an exemplary policy server 180. Policy server 180 may be a computer server including hardware components such as one or more processors, computer-readable memory, and network interface cards. Policy server 180 may include a network interface 210, policy engine 220, device mapper 230, session information storage 240, subscriber information storage 250, and application programming interface (API) 260. In various embodiments, session information storage 240 or subscriber information storage 250 may be an external database accessible to policy engine 220.

Network interface 210 may include hardware and/or instructions encoded on a machine-readable storage medium executed by a processor to send and receive data. In various embodiments, network interface 210 may be configured to communicate using the RADIUS protocol. Network interface 210 may be configured to receive RADIUS messages and extract information in the form of attribute-value-pairs. Network interface 210 may also be configured to generate and transmit RADIUS messages to various RADIUS clients such as a service router 160.

Policy engine 220 may include hardware and/or instructions encoded on a machine-readable storage medium executed by a processor to make policy decisions. Policy engine 220 may evaluate policy rules to make policy decisions. Policy engine 220 may apply the policy rules to information received via network interface 210 as well as information in subscriber information storage 240 and any other available information. Policy engine 220 may include various rule sets that may be evaluated based on a particular event or context. For example, policy engine 220 may evaluate an attachment rule set whenever policy server 180 receives a message indicating a new device is attaching to the network 100. An attachment rule set will be further described with respect to FIG. 3. Generally, a policy rule may include a condition and an action. Policy engine 220 may evaluate the condition and execute the action if the condition is true.

Device mapper 230 may include hardware or executable instructions encoded on a machine-readable storage medium configured to determine a model of user equipment. In particular, device mapper 230 may determine information regarding a residential gateway based on a residential gateway identifier included in an access request message. Device mapper 230 may use a MAC address as a residential gateway identifier. Device mapper 230 may determine a type of the residential gateway based on a prefix of the MAC address or a range of MAC addresses. The type may include a model name, a classification, or other grouping of similar devices. Device mapper 230 may also use a DHCP option 60 vendor class identifier as a residential gateway identifier. Device mapper 230 may compare all or part of the vendor class identifier to known vendor class identifiers to determine whether a received vendor class identifier is known. Device mapper 230 may also be configured with information regarding the capabilities of known residential gateways. For example, device mapper 230 may store protocol version information and bandwidth limits for each known residential gateway type.

Session information storage 240 may be a non-transitory machine-readable storage medium configured to store session information for sessions managed by policy server 180. Session information storage 240 may store any information received in a request in association with session identifiers used by policy server 180. In particular, information for a session authorized by policy server 180 may include a session identifier, residential gateway information including a residential gateway identifier, and an IP-address assigned to the residential gateway 140 for the session.

Subscriber information storage 250 may be a machine-readable storage medium configured to store subscriber information. Subscriber information may include a service plan selected by the subscriber. A service plan may include session limits such as bandwidth limits and allowed services. Policy server 180 may consider subscriber information when authorizing a session for a subscriber.

Application programming interface (API) 260 may include hardware or executable instructions encoded on a machine-readable storage medium configured to communicate with an external device such as a service portal 190. API 260 may provide authorization features to ensure that the external device is allowed to communicate with policy server 180. API 260 may make various features of policy server 180 available to an external device. For example, API 260 may provide access to information stored in device mapper 230, session information storage 240, or subscriber information storage 250. Accordingly, API 260 may be able to provide an external device with session information including subscriber information and residential gateway information. API 260 may also allow service portal 160 to update subscriber information storage 250 with updated subscriber information.

FIG. 3 illustrates an exemplary rule table 300. Rule table 300 may provide policy rules to be evaluated by policy engine 220 in a particular situation. For example, rule table 300 may be an attachment rule table that may be evaluated whenever a new device attaches to the network 100. Evaluation of rule table 300 may be triggered by receipt of an access request message from service router 160. Each rule of rule table 300 may include a name field 310, a condition field 320, and an action field 330. Rule table 300 may be configured by an operator of policy server 180.

Name field 310 may indicate a name of the rule. The name of the rule may be selected by the network operator to identify the rule. Name field 310 may also include a unique identifier.

Condition field 320 may include one or more logical statements that may be evaluated by policy engine 220. Condition field 320 may reference information received in a message or stored at the policy server 180. For example, in various embodiments, the MAC address received in an access request message may be referenced as NASREQ Message.ALUTIMETRA.ALC-Client-Hardware-Addr. A condition field may reference a plurality of pieces of information. A condition field 320 may also access information provided by device mapper 230 such as a residential gateway characteristics including, for example, a type, model, protocol, or capability.

Action field 330 may indicate one or more actions for policy server 180 to execute if the condition is true. For example, action field 330 may indicate how policy server 180 should respond to a request. Accordingly, rules table 300 may be used to make policy decisions to select actions in response to requests.

Rules 340 may be rules configured by a network operator. For example rule 340a may be named "Certified Devices" and determine whether a device attempting to attach to the network 100 is on a list of certified devices. For example, rule 340a may allow access if the prefix of the MAC address matches either 00:22:68 or 00:18:3f. Rule 340a may include a plurality of MAC addresses. Alternatively, rule 340 may define allowed devices using other residential gateway information such as the vendor class identifier or residential gateway characteristics provided by device mapper 230. As another example, rule 340b may be named "Blocked Devices" and determine whether a device attempting to attach to the network 100 is on a list of banned devices. If the device is on the banned list, policy server 180 may deny the request to attach to the network. As another example, rule 340c may be named "Certified Device; Unknown Subscriber." Rule 340c may determine that the device is a certified device and the subscriber is unknown and provide default services to the device. Default services may be, for example, access to only service portal 190, which may be used to sign up for full services.

Figure 4:
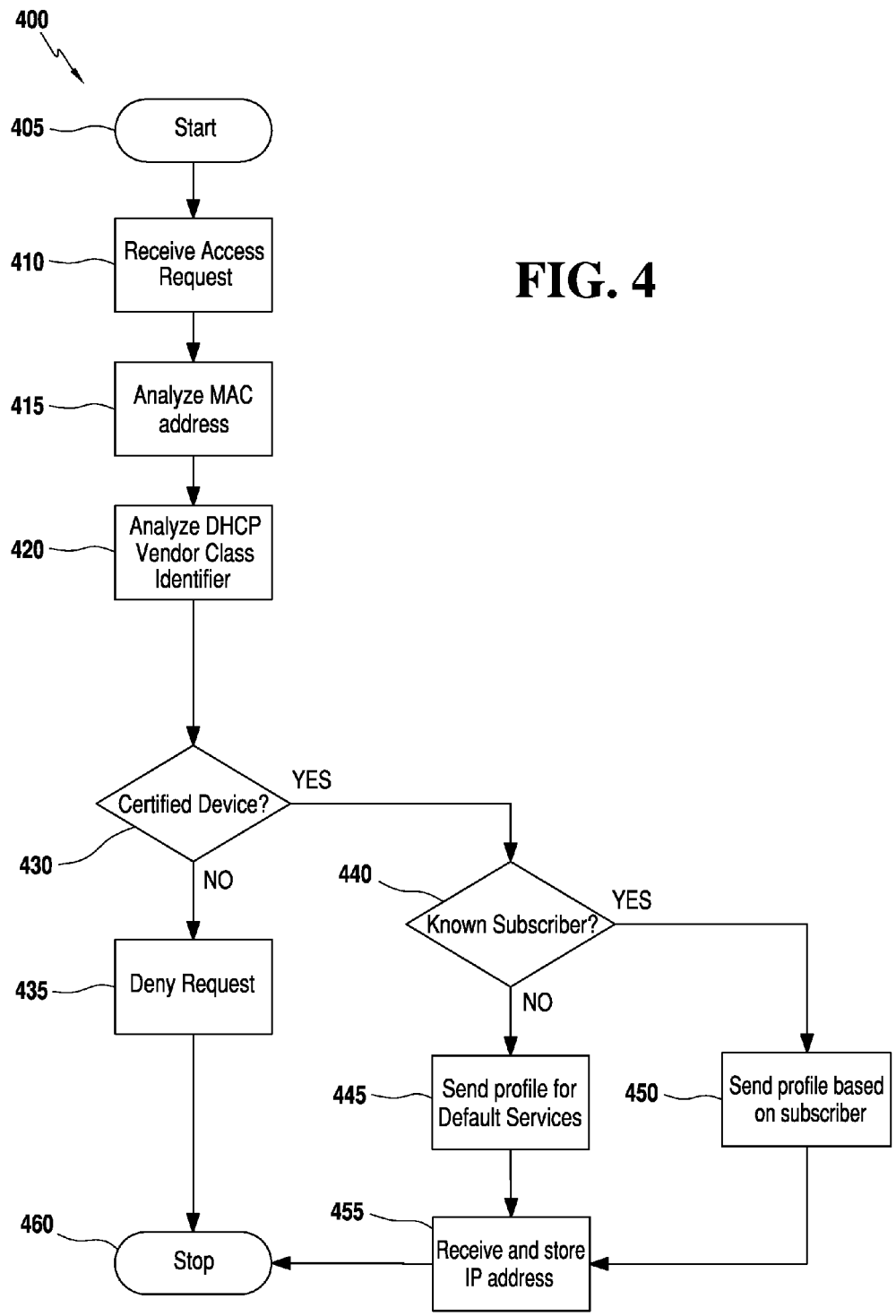
FIG. 4 illustrates a flowchart showing an exemplary method of making policy decisions.

FIG. 4 illustrates a flowchart showing an exemplary method 400 for making policy decisions based on residential gateway information. The method 400 may be performed by a policy server 180. The method 400 may begin at step 405 and proceed to step 410.

In step 410, the policy server 180 may receive an access request message requesting authorization of services for a residential gateway 140. The access request message may include information regarding the residential gateway including a MAC address, DHCP option 60 vendor class identifier, and a subscriber identifier, as well as other network information such as a network access server address, circuit ID, port type, and port ID. In various embodiments, the residential gateway 140 may receive an IP address only after authorization by the policy server 180.

In step 415, the policy server 180 may analyze the MAC address of the residential gateway 140 using the device mapper 230. For example, the policy server may analyze a prefix or an organizationally unique identifier (OUI) contained in the first three octets of the MAC address to determine a vendor or manufacturer of the residential gateway. The device mapper 230 may further analyze the MAC address based on a range of addresses or manufacturer specification to determine further device details. In various embodiments, a MAC address prefix or range of MAC addresses may be directly included in a policy rule condition.

In step 420, the policy server 180 may analyze a DHCP option 60 Vendor Class Identifier. The DHCP option 60 Vendor Class Identifier (VCI) may be included by the residential gateway 140 in a DHCP discover message and included in the access request message by a network access server such as service router 160. The device mapper 230 may analyze the VCI by comparing the contents to known strings using partial matching. For example, device mapper 230 may determine whether the VCI includes a name or abbreviation of a known vendor. Device mapper 230 may perform more specific analysis for vendors that use well defined VCIs. In various embodiments, the VCI comparison may be directly included in a policy rule condition.

In step 430, policy server 180 may determine whether the residential gateway is a certified device or a banned device. In various embodiments, only those residential gateways matching established criteria may be considered certified devices. Similarly, in various embodiments, only those residential gateways matching established criteria may be considered banned devices. It may be impossible to match some devices such as, for example, devices from new manufactures, new models, and devices having poorly defined vendor class identifiers or MAC address ranges. Policy server 180 may be configured to allow or deny access where it is impossible to determine a match based on operator preferences. For example, a policy rule may be written to exclude any device that does not match the certified devices, or a policy rule may be written to allow any device that does not match the banned devices. If the residential gateway 140 is a certified device, the method 400 may proceed to step 440. If the residential gateway 140 is a banned device, the method 400 may proceed to step 435.

In step 435, the policy server 180 may deny the access request. The policy server may transmit a rejection message to service router 160. Service router 160 may then end the connection. The residential gateway 140 may not receive an IP address. Accordingly, the denial of the access request by the policy server 180 may prevent the residential gateway 140 from obtaining access to the network. The method may then proceed to step 460, where the method ends.

In step 440, the policy server 180 may determine whether a subscriber identifier included in the access request message matches a known subscriber. Policy server 180 may query subscriber information storage 250 with the subscriber identifier to retrieve a subscriber profile. If the subscriber is known, the method may proceed to step 450. If the subscriber is unknown, the method may proceed to step 445.

In step 445, the policy server 180 may send a default profile for the unknown subscriber in an access accept message to the service router 160. The default profile may be used by the service router 160 to provide only limited service to the residential gateway 140. As will be described in further detail regarding FIG. 5, the default profile may enable the residential gateway 160 to communicate with a service portal 190 for establishing a subscriber profile. The method may then proceed to step 455.

In step 450, the policy server 180 may send a service profile in an access-accept message based on the subscriber profile. The service profile may include subscriber quality of service (QoS) settings such as bandwidth limits and charging information. In various embodiments, the service profile may also be based on residential gateway information. For example, the policy server 180 may limit the QoS settings based on the capabilities of the residential gateway. Policy server 180 may store information regarding the session of the residential gateway 140 in the session information storage 240. In particular, session information storage 240 may store a session identifier in association with the subscriber identifier and residential gateway information. The method may then proceed to step 455.

In step 455, the policy server 180 may receive and store an IP address associated with an established session. The IP address may arrive in, for example, an accounting start message for the session. The policy server 180 may add the IP address to the session information storage 240 in association with the session identifier, subscriber identifier, and residential gateway information. The method 400 may then proceed to step 460, where the method ends.

Figure 5:
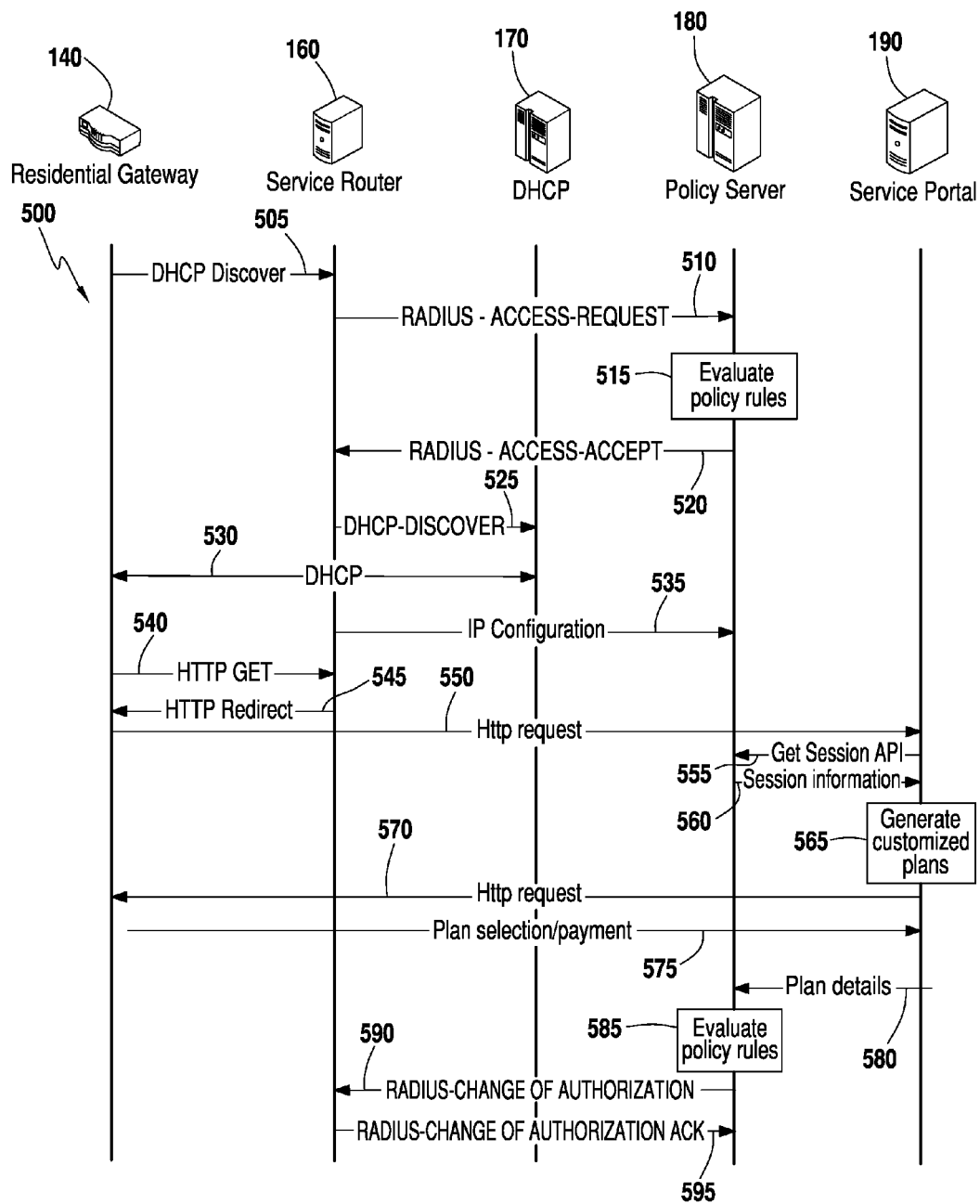
FIG. 5 illustrates a message diagram showing an exemplary method 500 of providing customized service plans.

FIG. 5 illustrates a message diagram showing an exemplary method 500 of providing customized service plans. The method 500 may be performed by the various components of network 100 including residential gateway 140, service router 160, DHCP server 170, policy server 180 and service portal 190.

In step 505, the residential gateway 140 may initiate attachment to the network 100. The residential gateway 140 may transmit a DHCP discover request toward service router 160. In step 510, service router 160 may generate an access-request message to send to policy server 180. The access-request message may be a RADIUS message. The access-request message may correspond to the access-request message described above regarding step 410.

In step 515, policy server 180 may evaluate policy rules based on information received in the access-request message. Accordingly, step 515 may include steps 415, 420, 430, and 440 described above. In particular, the policy server 180 may determine that the residential gateway 140 is a certified or otherwise allowed device, but the subscriber is unknown. In step 520, the policy server 180 may send an access-accept message including the default profile for the unknown subscriber. The default profile may include instructions to redirect all HTTP requests from residential gateway 140 to service portal 190.

In step 525, the service router 160 may forward the DHCP-discover request on toward DHCP server 170. In step 530, the DHCP server 170 and residential gateway 140 may communicate using DHCP to establish a connection and an IP address for residential gateway 140. Service router 160 may pass messages between DHCP server 170 and residential gateway 140 and extract any information necessary for configuring service router 160 to establish the connection. In step 535, service router 160 may send an accounting start message to policy server 180 indicating that the connection has been established. The accounting start message may include the IP address assigned to residential gateway 140. As discussed above regarding step 455, the policy server 180 may store the IP address in association with a session identifier, subscriber identifier, and residential gateway information.

In step 540, the residential gateway 140, or a user device behind residential gateway 140, may send an HTTP GET request. For example, the residential gateway 140 may request a website. In step 545, the service router 160 may redirect the HTTP request to the service portal 190 based on the default profile. In step 550, the residential gateway 140 may send an HTTP request to the service portal 190. The HTTP request may identify the residential gateway 140 using the IP address of residential gateway 140. In various embodiments, a known user may directly send an HTTP request to the service portal 190 in order to access or update subscription information.

In step 555, the service portal 190 may contact the policy server 180 using the API 260. In particular, the service portal 190 may invoke a function to request session information matching an IP address from policy server 180. Policy server 180 may query the session information storage 240 using the IP address determine the session information. In step 560, the policy server 180 may send the session information to the service portal. In various embodiments, the policy server 180 may provide only raw information such as the contents of the access-request message including a MAC address or DHCP option 60 vendor class identifier. If the subscriber is a known subscriber, the policy server 180 may also send current subscriber information. The policy server 180 may also send any additional information generated by the device mapper 230. For example, the policy server 180 may send a vendor name, type, model or capabilities of the residential gateway 140. Alternatively, the service portal 190 may include a device mapper and generate such information from the raw information.

In step 565, the service portal 190 may generate a list of customized service plans based on the residential gateway 140. The customized plans may be selected according to the capabilities of the residential gateway 140. For example, the customized plans may include QoS limits that the residential gateway 140 is capable of providing. Therefore, a customer may be prevented from selecting a plan that the residential gateway 140 is incapable of providing. The customized plans may include plans specifically designed to use the maximum capabilities of the residential gateway 140.

In step 570, the service portal 190 may send an HTTP webpage including the customized plans to the subscriber. In step 575, the subscriber may select a plan, agree to terms of service, and provide payment or billing information. In step 580, the service portal 580 may use the API 260 to send updated plan information to the policy server 180. The updated plan information may include service and billing information for the subscriber.

In step 585, policy server 180 may evaluate policy rules based on the new subscriber information. In particular, policy server 180 may determine that a previously unknown subscriber is now known. Policy server 180 may determine new authorization for the known subscriber based on the selected plan. If the subscriber has updated an existing service plan, the policy server 180 may also update the authorization to reflect any changes made by the subscriber. In step 590, the policy server 180 may send a RADIUS change of authorization (CoA) message to the service router 160 with a new profile for the residential gateway 140. In step 595, the service router 160 may acknowledge the CoA message indicating that the new profile has been implemented. The method may then end.

According to the foregoing, various exemplary embodiments provide for policy decisions based on a residential gateway. In particular, a policy server may allow a network operator to identify a residential gateway used by a subscriber and make policy decisions based on characteristics of the residential gateway.

It should be apparent from the foregoing description that various exemplary embodiments of the invention may be implemented in hardware and/or software executed by a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy server in a communication network comprising:
    receiving an access request message including a residential gateway identifier and a subscriber identifier;
    evaluating a policy rule based on the residential gateway identifier, the policy rule including a condition referencing the residential gateway identifier;

responding to the access request message based on evaluation of the policy rule and the subscriber identifier;
receiving an IP address of the residential gateway; storing the IP address in association with the residential gateway identifier;
receiving, from a service portal, a request for identification of a residential gateway associated with an IP address;
sending the stored residential gateway identifier to the service portal;
receiving new subscriber information; and
changing an authorization of the residential gateway based on the new subscriber information.

2. The method of claim 1, wherein the residential gateway identifier is a dynamic host configuration protocol (DHCP) option 60 vendor class identifier.

3. The method of claim 2, further comprising comparing the vendor class identifier to predefined identifiers and determining a type of the residential gateway.

4. The method of claim 1, wherein the residential gateway identifier is a Media Access Control (MAC) address.

5. The method of claim 4, further comprising comparing the MAC address to an address prefix.

6. The method of claim 1, wherein the step of responding to the access request message based on evaluation of the policy rule and the subscriber identifier comprises:
determining that the subscriber identifier is not associated with a valid service plan;
authorizing a default session allowing the residential gateway to communicate with a service portal; and
storing the residential gateway identifier and the subscriber identifier in association with the default session.

7. The method of claim 1, further comprising: determining residential gateway capabilities based on the residential gateway identifier; and sending the residential gateway capabilities to the service portal.

8. The method of claim 1, wherein the condition references a plurality of network gateway identifiers.

9. A policy server comprising:
a memory and a hardware processor;
a network interface configured to receive an access request message initiated by a residential gateway attaching to a network, the access request message including a residential gateway identifier and a subscriber identifier; and
a rules engine processor configured to evaluate conditions of policy rules, execute actions corresponding to true conditions, at least one policy rule including a condition based on the residential gateway identifier;
receive an IP address of the residential gateway;
store, in the memory, the IP address in association with the residential gateway identifier;
receive, from a service portal, a request for identification of a residential gateway associated with an IP address;
send the stored residential gateway identifier to the service portal;
receive new subscriber information; and
change an authorization of the residential gateway based on the new subscriber information.

10. The policy server of claim 9, wherein the condition of the at least one policy rule includes a certified residential gateway identifier and the action of the at least one policy rule instructs the rules engine to allow a session providing service to the residential gateway.

11. The policy server of claim 10, further comprising: a session information storage configured to store information regarding the session including the residential gateway identifier; and an application programming interface configured to provide an external service portal access to the session information and configured to receive subscriber information from the external service portal.

12. The policy server of claim 9, further comprising:
a device mapper configured to determine residential gateway characteristics based on the residential gateway identifier.

13. The policy server of claim 12, further comprising: a session information storage configured to store the residential gateway characteristics determined by the device mapper; and an application programming interface configured to provide an external service portal access to the residential gateway characteristics and configured to receive the subscriber information from the service portal.

14. A non-transitory computer-readable storage medium encoded with instructions executable by a processor of a policy server, the non-transitory computer-readable medium comprising instructions for:
receiving an access request message including an residential gateway identifier and a subscriber identifier;
evaluating a policy rule based on the residential gateway identifier, the policy rule including a condition referencing the residential gateway identifier;
responding to the access request message based on evaluation of the policy rule and the subscriber identifier;
receiving an IP address of the residential gateway;
storing the IP address in association with the residential gateway identifier;
receiving, from a service portal, a request for identification of a residential gateway associated with an IP address;
sending the stored residential gateway identifier to the service portal; receiving new subscriber information: and
changing an authorization of the residential gateway based on the new subscriber information.

15. The non-transitory machine-readable storage medium of claim 14, wherein the residential gateway identifier is a dynamic host configuration protocol (DHCP) option 60 vendor class identifier, the non-transitory machine-readable storage medium, further comprising instructions for comparing the vendor class identifier to predefined identifiers and determining a type of the residential gateway.

16. The non-transitory machine-readable storage medium of claim 14, wherein the residential gateway identifier is a Media Access Control (MAC) address, the non-transitory machine-readable storage medium
further comprising instructions for comparing the MAC address to an address prefix.

17. The non-transitory machine-readable storage medium of claim 14, wherein the instructions for responding to the access request message based on evaluation of the policy rule and the subscriber identifier comprise instructions for: determining that the subscriber identifier is not associated with a valid service plan; authorizing a default session allowing the residential gateway to communicate with a service portal; and storing the residential gateway identifier and the subscriber identifier in association with the default session.

18. The non-transitory machine-readable storage medium of claim 14, further comprising instructions for: determining residential gateway capabilities based on the residential gateway identifier; and sending the residential gateway capabilities to the service portal.

* * * * *